United States Patent [19]
Narayanaswami

[11] Patent Number: 6,104,790
[45] Date of Patent: Aug. 15, 2000

[54] GRAPHICAL VOICE RESPONSE SYSTEM AND METHOD THEREFOR

[75] Inventor: Chandrasekhar Narayanaswami, Wilton, Conn.

[73] Assignee: International Business Machines Corporation, Armonk, N.Y.

[21] Appl. No.: 09/239,852

[22] Filed: Jan. 29, 1999

[51] Int. Cl.[7] .................................................. H04M 11/00
[52] U.S. Cl. ...................................... 379/93.25; 379/93.17
[58] Field of Search .............................. 379/93.01, 93.09, 379/93.17, 93.21, 93.22, 93.25, 88.17–88.19, 88.13

[56] References Cited

U.S. PATENT DOCUMENTS

| | | |
|---|---|---|
| 5,226,080 | 7/1993 | Cole et al. . |
| 5,416,831 | 5/1995 | Chewning, III et al. ............ 379/93.25 |
| 5,488,650 | 1/1996 | Greco et al. . |
| 5,592,538 | 1/1997 | Kosowsky et al. ................... 379/93.17 |
| 5,771,276 | 6/1998 | Wolf . |
| 5,802,526 | 9/1998 | Fawcett et al. ....................... 379/88.18 |

OTHER PUBLICATIONS

"Voice Augmented Menu Automated Telephone Response System", IBM Technical Disclosure Bulletin, vol. 38, No. 2, pp. 57–61, Feb. 1, 1995.

*Primary Examiner*—Wing F. Chan
*Attorney, Agent, or Firm*—McGinn & Gibb, P.C.; Jay P. Sbrollini, Esq.

[57] ABSTRACT

A method and system for communicating between a calling party and a called party, includes a dialer for dialing a communication device of a called party, a sensor for sensing whether a voice menu file is associated with the communication device of the called party, and an interactive display for displaying the voice menu file when the sensor senses the voice menu file.

23 Claims, 7 Drawing Sheets

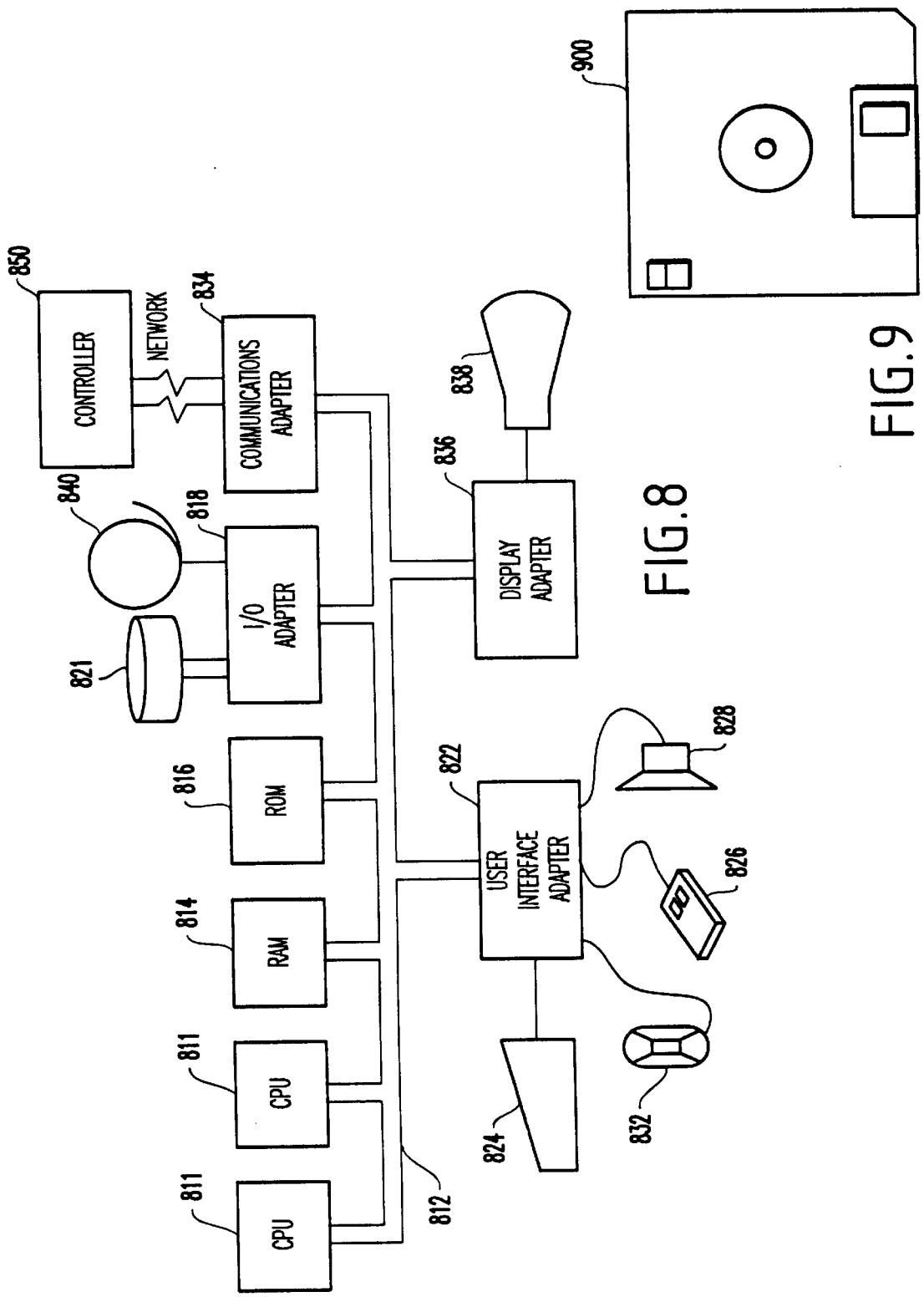

GRAPHICAL VOICE RESPONSE SYSTEM AND METHOD THEREFOR

BACKGROUND OF THE INVENTION

1. Field of the Invention

The present invention generally relates to a graphical voice response system and method, and more particularly to a graphical voice response system and method which, when connection is made to a party with a recorded phone menu, displays an interactive graphical screen.

2. Description of the Related Art

In conventional telephony applications, a user (e.g., caller) dials a party and typically receives an audio phone menu of choices which the user can access by pressing certain keys on a number pad. Typically, the caller must listen to an entire phone menu sequentially, and thus the time spent on such phone calls is long and costly. Thus, the conventional manner of hearing the entire phone instruction before making selections consumes a lot of time. Thus, phone bills are high and efficiency is low. Yet another problem is that the user has the aggravation of having to remember the options or having to write them down.

Additionally, most companies nowadays have web sites that serve a similar purpose as recorded phone menus. However, users typically have to switch from one application to another, to access the web site. Thus, this is inconvenient.

Further, while usage of the Internet has made great strides in the past several years, most users have access to a phone but not so much to the Internet. Thus, obtaining information from the company sometimes is inconvenient, especially for mobile telephone users.

Another problem of the conventional systems/methods is that access to the Internet/World-Wide-Web (WWW) requires logging-in to an Internet Service Provider (ISP). Log-in may be a lengthy process, requiring the user to wait for an available line or other delays. Thus, access to the Web may be time consuming.

Yet another problem is that when a voice phone menu changes, if a user has memorized the numbers and options provided on the recorded phone menu, the user may automatically "punch in" the wrong numbers. This is inconvenient and aggravating to the user, and the user must ultimately listen to the lengthy, recorded phone menu again.

SUMMARY OF THE INVENTION

In view of the foregoing problems of the conventional systems and methods, an object of the present invention is to provide a structure (and method) for reducing the time spent on phone calls in which a phone menu is presented to a user (e.g., caller).

Another object of the present invention is to provide a system and method with an interactive graphical screen that is presented when connection is made to a party with a recorded phone menu.

Yet another object of the present invention is to display phone menu options to a user as input devices (e.g., graphical buttons) that can be actuated to access the desired feature or item.

Still another object of the invention is to save the user from having to remember the options in a recorded (often lengthy) phone menu or having to write the options down while listening to the same.

In a first aspect, a communication system for communicating between a calling party and a called party, includes means for dialing a communication device of a called party, means for sensing whether a voice menu file is associated with the communication device of the called party, and an interactive display for displaying the voice menu file when the sensing means senses the voice menu file.

In a second aspect, a method for communicating between a calling party and a called party, includes dialing a communication device of a called party, sensing whether a voice menu file is associated with the communication device of the called party, and interactively displaying the voice menu file when the voice menu file is sensed. In yet another aspect, a computer program product is provided storing a program including the above-mentioned method.

With the unique and unobvious features of the present invention, by virtue of providing a graphical voice response system, the time spent on phone calls in which a phone menu is presented to a caller, can be greatly reduced. Additionally, the interactive graphical screen is presented when connection is made to a party with a recorded phone menu, thereby further reducing the time spent on the call. Menus in such a system are presented each level at a time, further greatly reducing the time.

Moreover, the phone menu options are displayed to a user as graphical buttons that can be actuated. Thus, the system is "user-friendly" and the user need not remember the options in the recorded phone menu or have to write them down while listening to the same.

Another advantage of the present invention is that even when a voice phone menu changes, the user can quickly scan the new options since the most current menu will be shown on the phone screen display and the user merely can look and "click" on the desired options. As a result, changes in the phone menu will be immediately evident to the user and the user can easily adapt to the changes.

BRIEF DESCRIPTION OF THE DRAWINGS

The foregoing and other objects, aspects and advantages will be better understood from the following detailed description of a preferred embodiment of the invention with reference to the drawings, in which:

FIG. 8 is a schematic block diagram of the structure of an exemplary information handling/computer system for use with the first preferred embodiment of the present invention; and FIG. 9 illustrates a medium for storing a program for implementing the method according to the present invention.

DETAILED DESCRIPTION OF PREFERRED EMBODIMENTS OF THE INVENTION

Figure 1:
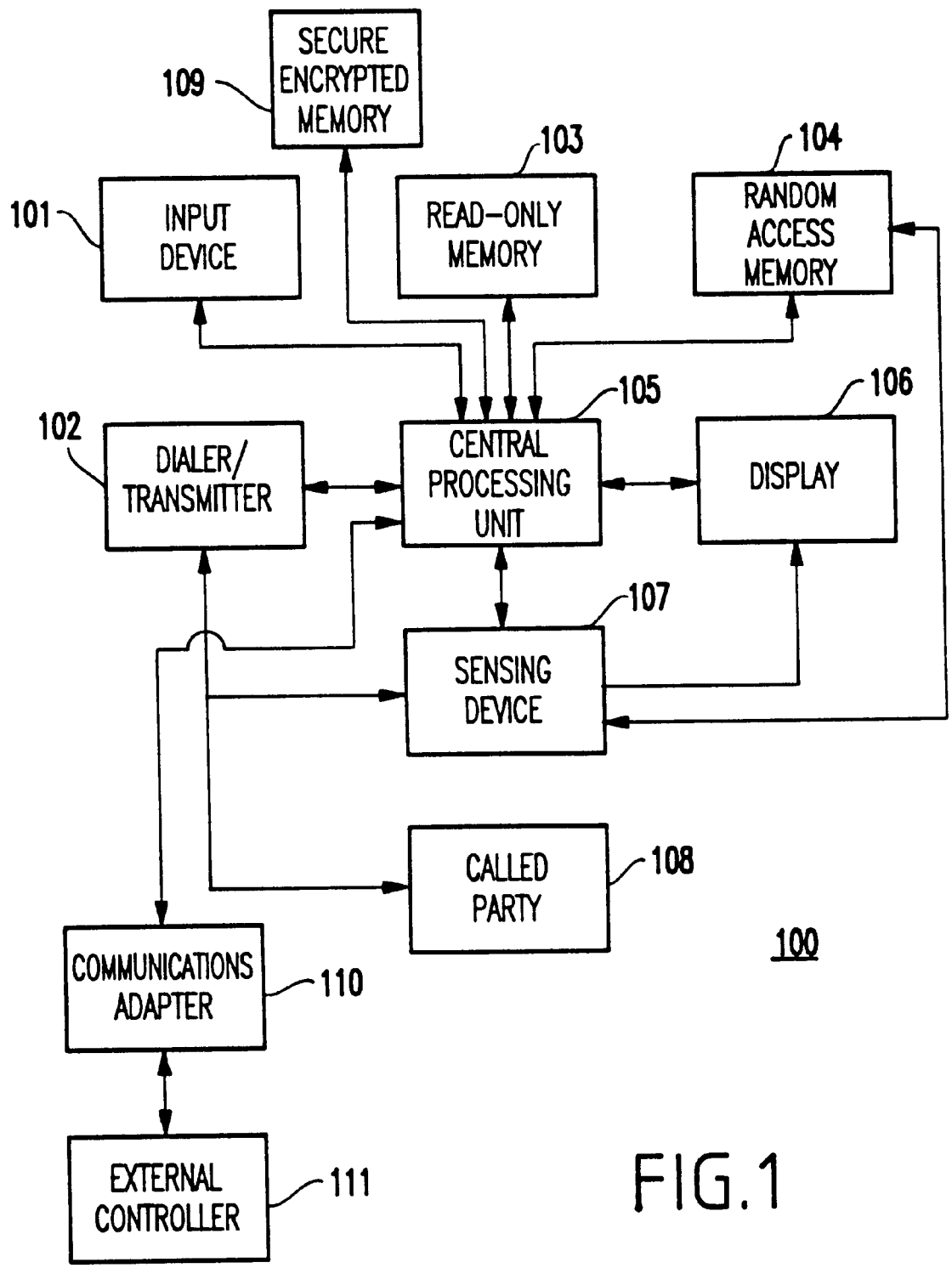
FIG. 1 is a schematic block diagram of a graphical voice response system 100.

Referring now to the drawings, and more particularly to FIGS. 1–9, a first preferred embodiment of the present invention is provided.

Generally, the present invention provides a method and telephone application including an interactive graphical response system including an interactive graphical screen that is presented when connection is made to a party with a recorded phone menu.

Referring now to FIG. 1, a graphical voice response system 100 is illustrated according to the invention. In the exemplary embodiment, it is assumed that the invention is incorporated for use with a telephone system. As will be appreciated by one of ordinary skill in the art, the invention would find equal benefit with any communication device having a display and which is communicating with another communication device having a voice menu file.

The system 100 includes an input device 101 such as a mouse, joystick, trackball, touch pad, touch screen, voice recognition input, pointing device, etc.

Further, a number pad (shown in greater detail in FIGS. 3–7) is provided including a dialer 102 for dialing the called party's telephone number and for signaling (e.g., ringing) the called party's telephone that a call is incoming. Along these lines, a transmitter may be provided including suitable antenna circuitry for transmitting the call should the invention be incorporate into a wireless telephone or the like.

Also included are a central processing unit (CPU) 103, a read-only memory (ROM) 104 for storing application program and the like, a random access memory (ROM) 104, a central processing unit (CPU) 105 for managing the system components, a display 106 for displaying the phone menu thereon, and a sensing device 107 for sensing the number dialed, and whether a phone menu is stored locally (e.g., in RAM 104) and for signaling the CPU to access another entity (e.g., called party, Internet, intranet, or another data network) to obtain (via download or the like) a current phone menu of the called party, if available. While not part of the invention, the called party 108 is the object of the communication with the calling party incorporating the present invention.

Additionally, the system of the present invention includes a secure encrypted memory 109, a communications adapter 110, and an external controller 111.

The encrypted memory 109 preferably is a removable media and is selectively inserted into the communication device (e.g., telephone in the exemplary, non-limiting embodiment). The memory 109 may be implemented as a Smart Card, or as another auxiliary, personal device such as a PalmPilot® or personal data assistant (PDA).

The communications adapter 110 may be provided for connecting the system to the Internet, intranet, or another externally connectable data processing network, an external controller 111, etc. or the like, as discussed in further detail below.

The display screen 106 displays the phone menu options as graphical buttons or the like) that can be actuated by movement of the input device 101 to the graphical button and actuating (e.g., "clicking on") the same with the input device 101. Thus, users can get the information they desire by making selections using the buttons on the screen 106.

By displaying the phone menu on the display screen 106 at an entire menu level at a time, the time spent on such phone calls can be reduced greatly. Hence, the user need not hear the entire phone instruction before making selections and time is not wasted navigating the phone menu. Thus, by reducing the time spent by users on such phone calls, companies with recorded phone menu can reduce their cost on their phone bills tremendously. This invention also saves the user from the aggravation of having to remember the options or having to write them down.

Referring to FIGS. 2–7, the operation of the graphical voice response system will be described.

Figure 2:
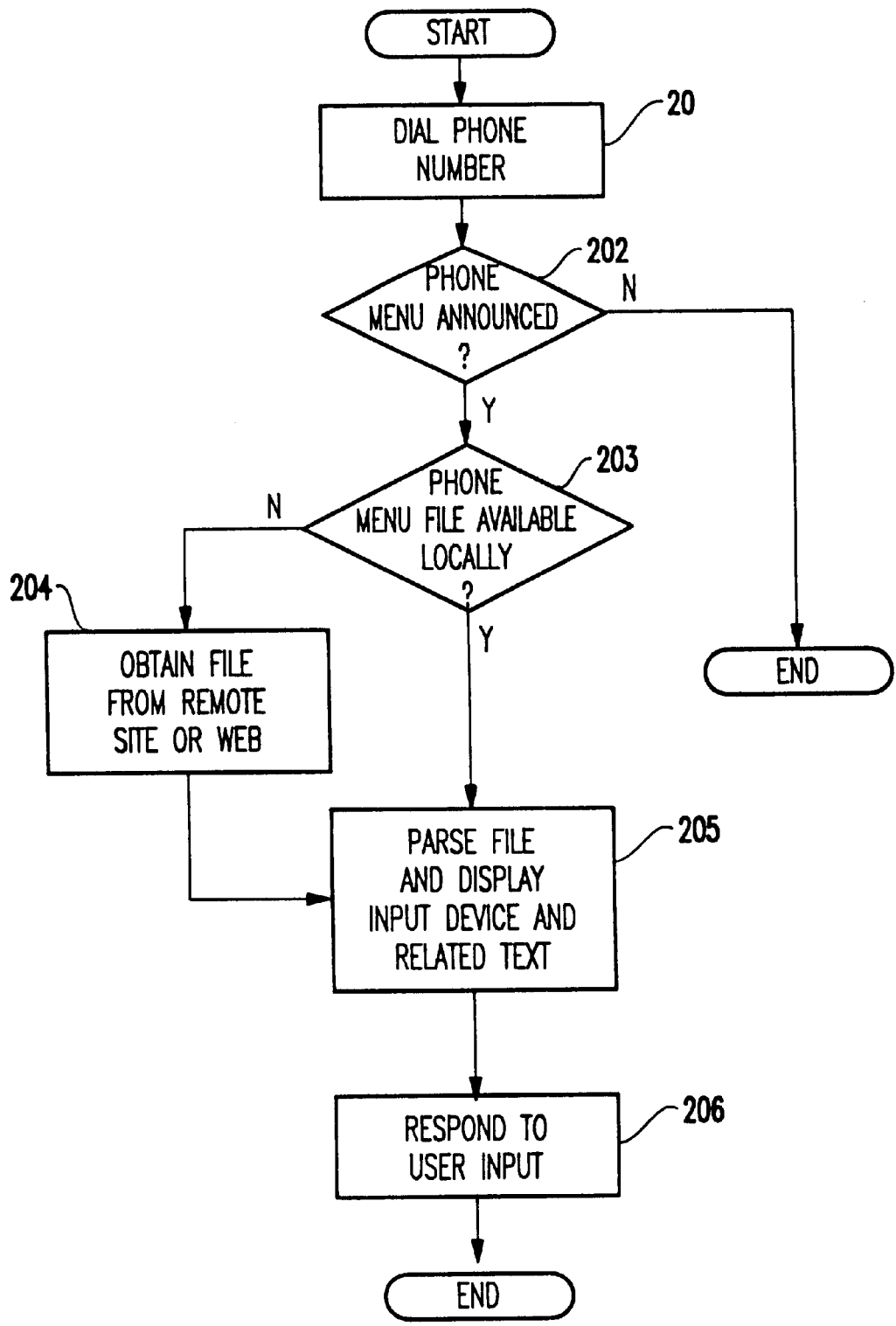
FIG. 2 is a flow diagram of the preferred method and system operation of the invention.

In operation, first, in step 201 of the method 200 of FIG. 2, communication is begun between a calling party and a called party. For example, a telephone number is dialed by a user (e.g., the calling party) by the dialer 102. Specifically, the user dials the desired number from his graphical voice response system (e.g., screen phone).

Figure 3:
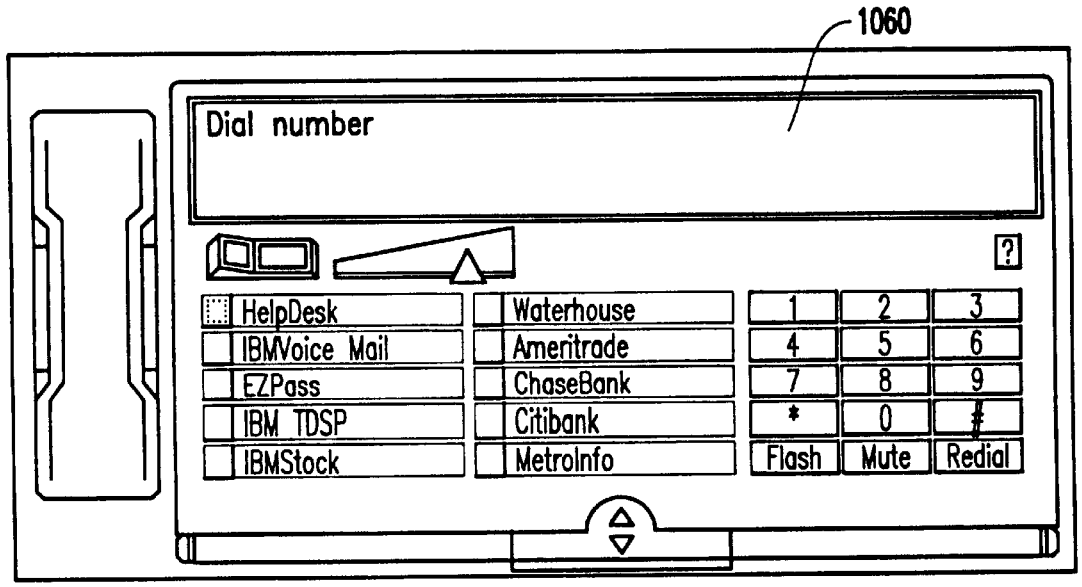
FIG. 3 is a display screen output illustrating the phone screen according to the present invention.

FIG. 3 shows the initial screen seen by the user. In operation, "Dial number" will appear on the screen display before dialing a number is commenced. Such a message will act as a prompt to the user. Once the inputting of numbers is begun either by a speed-dialer or the manual numberpad (e.g., shown in FIG. 3) the "Dial number" message will disappear and the digits of the number input will begin to appear on the display.

The number may be entered manually or selected via choosing a prerecorded number that is associated with a speed dial button, as shown in FIG. 3. The number dialed appears on the display screen 1060 (e.g., see FIG. 3) under normal operation, unless the user desires privacy and does not want the number to appear on the display. In this case, the user may "lock" the display so as not to show the number, whereas the display may be "unlocked" by using a password or the like. Moreover, the sensitive data (e.g., personal identification number (PIN), bank/checking account numbers or passwords, credit card numbers, etc.) could be encrypted by the user. Another option is that the user may operate a switch or button to block the numbers being displayed. Such blocking of the numbers provides security and confidentiality, especially in an unsure or crowded area where third parties may be attempting to view the display screen.

In step 202, after the phone call is answered, it is determined whether a phone menu is present by a predetermined signal or tone (e.g., prompted by sound message) provided from the called party to the calling party. Such a tone may be similar to an Answer/response tone signal (e.g., a so-called ANSam signal) issued by a called party under a facsimile protocol transmission signaling that a transmission may begin.

If so, the process proceeds to step 203. If there is no phone menu being prompted (e.g., the called party's telephone has no phone menu associated therewith and the determination in step 202 is "NO"), then the call simply proceeds normally and the present invention is not activated (or necessary).

In step 203, it is determined whether a voice menu file for the number called is available locally (e.g., in the RAM 104 or auxiliary storage device). Thus, for example, the screen phone may already have a pre-stored/pre-loaded voice menu file associated with the number dialed (e.g., described in detail below). The phone may come pre-loaded with such a menu.

If no voice menu file is locally available for the number being called (e.g., a "NO" in step 203, then in step 204 the screen phone may request the remote end (e.g., called party's phone system) to transmit the menu file to the screen phone. Such an operation is transparent to the user and performed in real-time (e.g., 56 Kbytes/second).

Thus, the called party could transfer the phone menu to the calling party (e.g., downloaded on demand) over the communication link (either wire or wireless) in a voice-over-data protocol in which voice communications is given preference over data communications while sharing a same communication line/link. In such a case, the single line/link is multiplexed for voice and data communication.

Alternatively, the calling party may obtain the phone menu from a third party source (e.g., over the Internet, intranet, or other externally coupled network) through a downloading procedure directly to the calling party's phone. Such a downloading through a third party source would be performed with the user's telephone coupled to the third party source (e.g., through the Internet, intranet, other network, etc.). Thus, the telephone has a capability of being coupled to the third party.

Moreover, in an implementation with a mobile phone, the mobile telephone (e.g., using a PalmPilot® or personal data assistant (PDA), etc. could use an infrared (IR) or other wireless communications means to get the menu to the PalmPilot® or PDA and in turn get the menu to the mobile telephone. The PalmPilot® or PDA itself could get the phone menu from the Internet, intranet, or other externally connectable data processing network, or from a removable media such as a secure encrypted memory 109 shown in FIG. 1 or other computer storage means such as a diskette, and then supply it to the mobile communication device (e.g., telephone).

Thus, the user may download the voice menu file from the Internet, intranet or other data network by accessing the called party's web site or the like. In such a case, the called party must make the voice menu file available for downloading.

A determination may be made to see whether the menu file is available locally and is current by comparing file versions. For example, along with the answer/response tone signal mentioned above, the version number may be determined in a handshaking operation between the called and calling party in establishing the communication procedure.

If the menu file is current, the local copy may be used. If the menu file is not current, the latest menu file may be transferred (e.g., from the remote called party's site, the Internet, intranet, other data network, etc. as described above). The transfer of the latest menu file may occur at the beginning of the call for use during the present call and during subsequent calls to the same number until there is another change in the menu file. When there is another change in the menu file, the above process of retrieving the last file (e.g., most current) is repeated.

Figure 4:
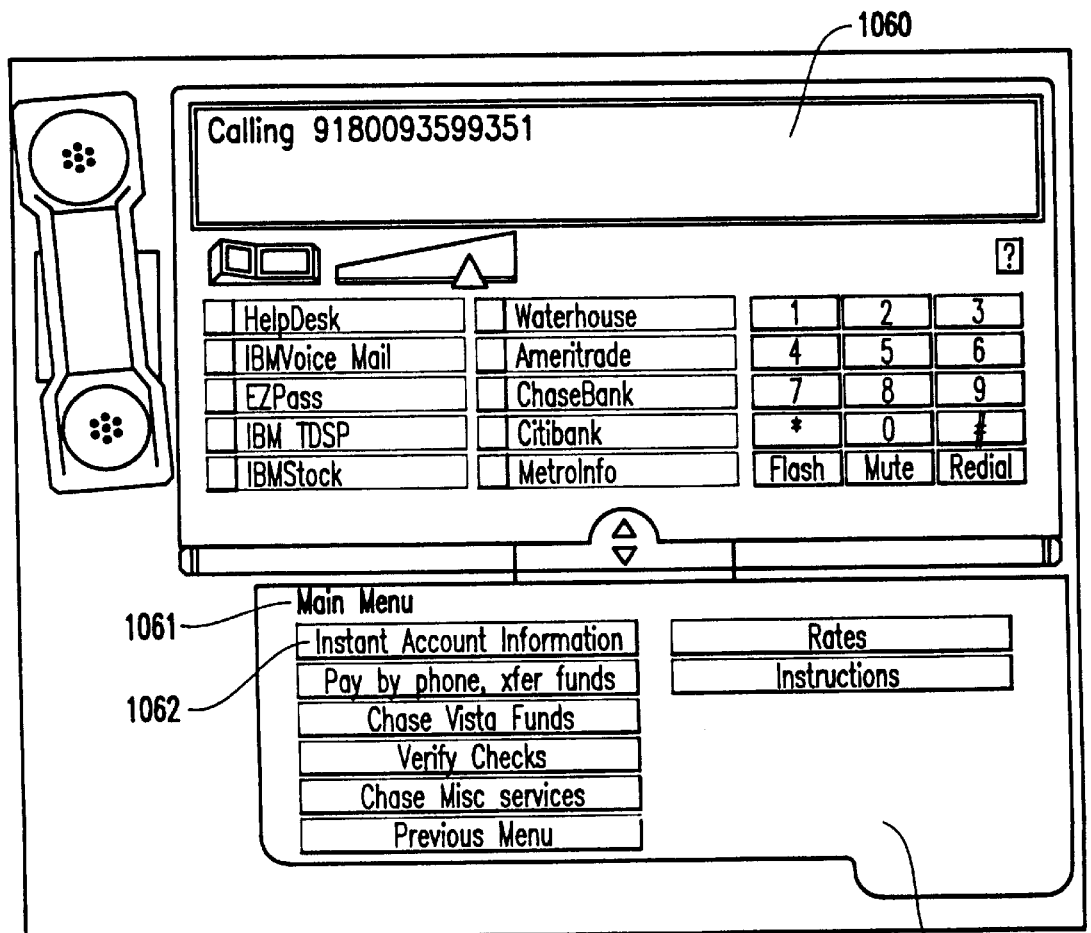
FIG. 4 is a display screen output illustrating a main menu of the phone screen according to the present invention.

In step 205 and as shown in the display screen of FIG. 4, once the correct voice menu file is available locally, the screen phone parses the voice menu file and displays a main menu 1061 for the voice mail menu on another display portion 1060'. Such a portion may be slidable from a portion of the communication system. In the case of FIGS. 3–7, for example, the display 1060' is slidable into and out of the bottom portion of the system towards the user. It is further noted that the display 1060' could be automatically slidable out of the system housing (or otherwise viewable) upon sensing of the voice phone menu of the called party. At the completion of the call, the display 1060' could be automatically retracted into the housing (or otherwise made not viewable by the user).

Each option in the current menu is shown as an actuator (e.g., button) with either a graphical icon on the button or text on the button indicating the function of the button.

FIG. 4 shows the first set of choices the user is presented with after the user dials, for example, the "Chase Bank". Then, the user can actuate (e.g., "click on") any button the user chooses. Thus, in step 205, the system responds to the user's actuation of the buttons and displays the next level or the previous level menu or the main menu 1061 corresponding to the user's input based on actuation of the appropriate buttons.

Figure 5:
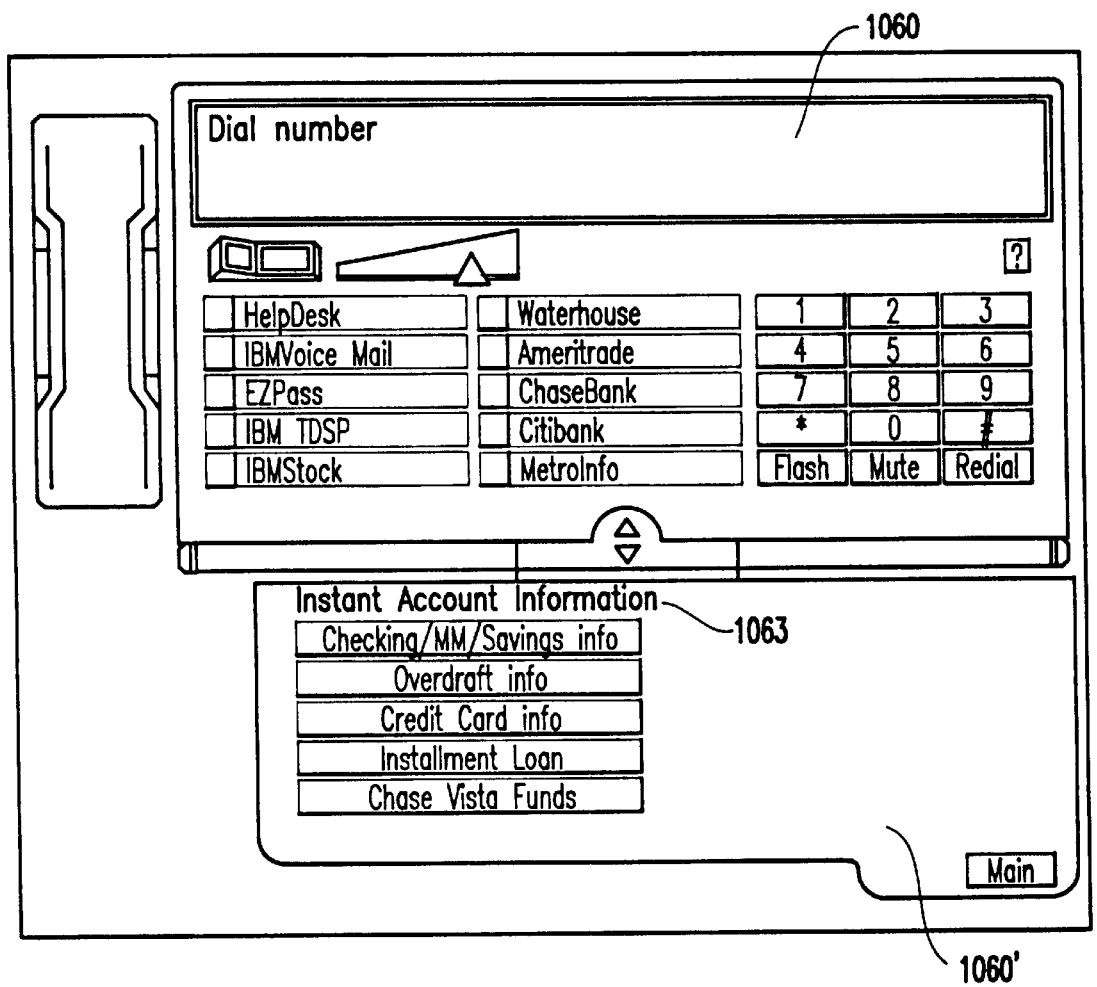
FIG. 5 is a display screen output illustrating an instant account information screen of the phone screen according to the present invention.

For example, if the user clicks on an "Instant Account Information" button 1062 in FIG. 4, it presents the user with a new screen as shown in FIG. 5.

In FIG. 5, the user selects the "Checking/Savings Account Information" 1063 option. At this point, the system enters the account information and PIN code for the user automatically by retrieving such information from a file (e.g., preferably encrypted to ensure privacy and safety). An application or software program/module may be provided for the mobile (e.g., cellular phone) such that upon entry of, for example, an account number, a PIN number and/or a card number, the software inserts the information (e.g., as bits or the like) in the correct position in the InfoFile. Such application software would know where (e.g., the bit positioning the bit stream) to insert such information in the InfoFile.

The PIN and account number could in another implementation be pre-stored in the user's telephone system ID. For example, the sensitive information could reside on the removable media (e.g., Smart Card or auxiliary personal device such as the PalmPilot® or PDA), and then such information would be input to the telephone. Thus, for example, the PDA could have the information resident therein and then transfer the information to the telephone via IR, other wireless communications means, etc. However, the PIN codes need not be pre-stored in the phone, and such could be entered manually by using the numberpad.

Figure 6:
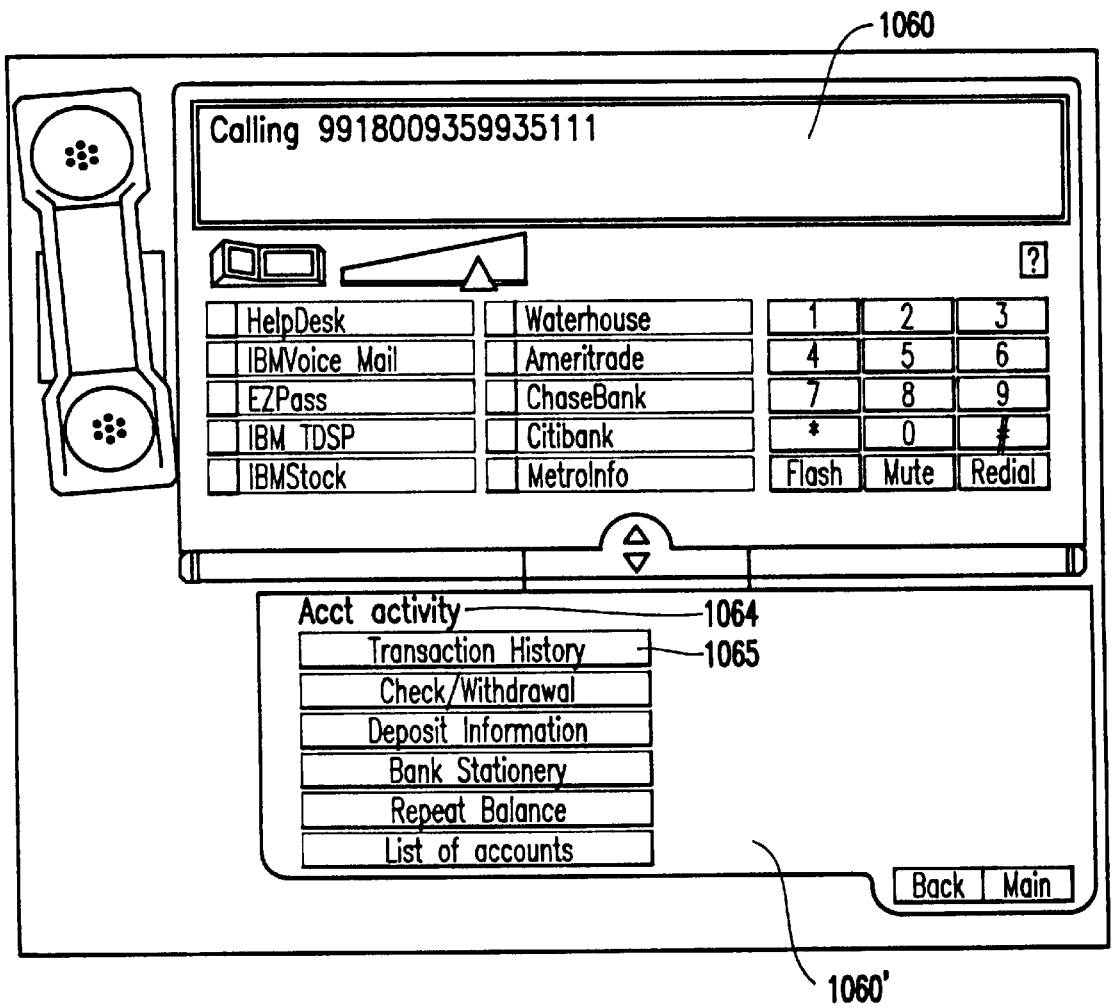
FIG. 6 is a display screen output illustrating an account activity screen of the phone screen according to the present invention.
Figure 7:
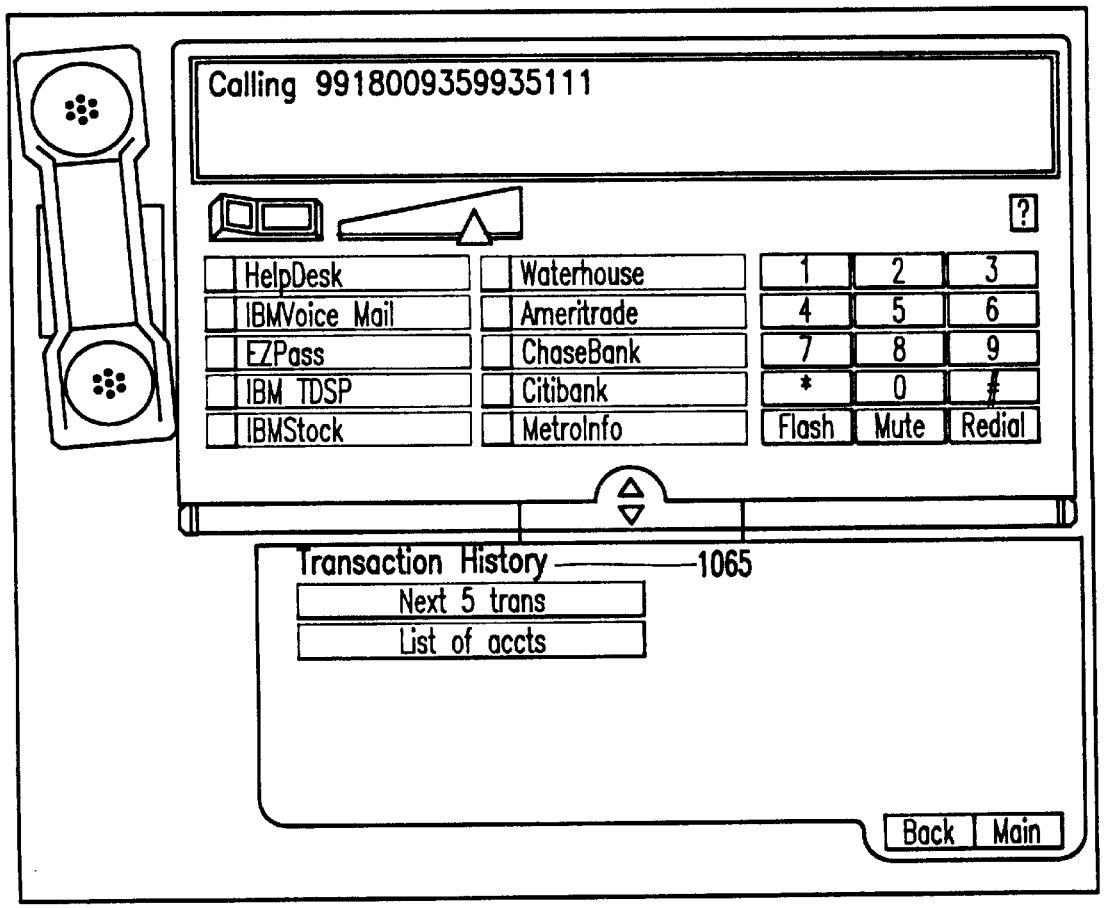
FIG. 7 is a display screen output illustrating a transaction history screen of phone screen according to the present invention.

Then, the user is presented with the screen shown in FIG. 6 where the user can choose from several options of "Account Activity" button 1064 including a "Transaction History" button 1065. Choosing button 1065 from FIG. 6, brings up the screen shown in FIG. 7. The Interactive Voice Response (IVR) system is also playing the audio as the screen is being presented to the user. However, a key advantage of the system and method of the present invention is that all options in a menu level are presented in a visual screen up front, all at once.

The information necessary to produce the screens shown in FIGS. 4–7 is stored in an input file in the exemplary embodiment. The structure of the input file is discussed in greater detail with an example provided below.

At any point during the above-described process, the caller may fall back to the traditional approach of speaking with a live operator if such an option is provided. Such a feature may be provided in the called party's system such as by pressing "O" at any time to be connected with an operator. The graphical representation is preferably in addition to the audio output provided by the voice response system.

As an option, the user may define "fast paths" if desired. For example if the user wants a fast path that checks the balance in the checking account, such an option may be specified in a Fast Path Menu File.

For example, for a user to view the last five transactions in the user's account, rather than sequentially view each intermediate menu, the user may want to "jump" immediately to the listing of the last five transactions (e.g., a lower, subsequent level menu). Hence with one actuation of a button or click of the input device by the user, a plurality of stored numbers may be sequentially dialed to immediately access the menu desired by the user. Such an operation would be transparent to the user.

Again, taking the example above, one click (actuator input) by the user would enter the user into the fast path menu path and the last five transactions would be immediately visible on the display without any further input from the user being required.

Conversely, fast paths also may be similarly defined for allowing the user to traverse from a lower menu to a higher menu with a single "click" and without any further input from the user. This feature is similar to that of a "Main Menu" icon appearing on a graphical user interface which immediately "pops up" the Main Menu. However, with the invention such fast paths can be user-defined to allow the user to view any menu level quickly and easily.

In another example, the system will enter all the information necessary to get directly to a "Checking Balance" menu, without necessarily showing the intermediate menus to the user.

Other customized options can be defined as well. For example, the user may specify that the system read out the savings balance after reading the checking balance. The fast path menu file is distinct from the regular menu file in the exemplary implementation but can be combined in other implementations.

In the exemplary embodiment, inputting the Number-File mapping occurs by actuating, for example, a right mouse button (or other suitable input device as described below) and by selecting the option "Menu", a screen will "pop up" displaying an area where users can put in the phone number and the name of the corresponding text file. For example, a plurality (e.g., 32) memory buttons may be provided and can be associated with the user's desired information/numbers.

In the exemplary embodiment, preferably there are two files that are provided for the users with the following convention: "<filename>.txt" and "<filename>fast.txt". Users should put "<filename>.txt" in the Location field. Users can close the screen by clicking the right mouse button and unselect the option "Menu". Then, the Number-File mapping is stored in an initial configuration file called "visualphone.ini".

Regarding selecting phone menu options on the screen, when connection occurs to a phone number that matches with one of the phone numbers of the Number-File mappings, a screen will pop up with two buttons labeled "Regular" and "Fast".

The "Regular" option provides a comprehensive menu, whereas the "Fast" option provides a shortcut to frequently-used options. The "Fast" option is tailored to user's preferences. For example, this feature can be implemented by a small computer program asking the user what the user wishes to do, and the user essentially points and clicks with the input device (e.g., mouse, cursor, etc.). The system preferably is adaptive in which the system learns the user's preferences (e.g., the user's most frequent accesses to menu items). Once the "Regular" option or the "Fast" option is selected, the next screen will show the options of the first level menu. Users can then navigate the phone menus by selecting corresponding buttons on the screen.

Regarding the overall structure, a key feature of the Graphical Voice Response System is the ability to parse an ASCII file (e.g., the InfoFile), with special formatting that contains phone menu information and display phone menu options as buttons with text on a screen. It also provides a user interface for users to input the Number-File mappings which are going to be stored continually in the initial configuration file "visualphone.ini". Provisions are available to reuse menus from a previous path to keep the file size to a minimum and the file elegant. It is noted that if predetermined, sensitive information is stored in the InfoFile, then preferably it is encrypted. Such encryption can be performed with conventional, known means.

The format of the InfoFile for phone menus is as follows:

---

Title Line: <field 1A>|<field 1B>|<field 1C>|>field 3A>/<field 3B>%<field 4>$<field5>|<fieldA>@<field6>[<field 7>
    Menu Line: <field>|<field 3A>/<field 3B>%<field 4>$<field 5>|<field 5A>@<field 6>[<field 7>
    Menu Lines for children: <field2>|<field 3A>/<field 3B>%<field 4>$<field 5>|<field 5A>@<field 6>[<field 7>

---

The Title Line is the very first line of the file, and the Menu lines are all the other lines. Menu lines are repeated as necessary as explained below. Following each menu line, menu lines for each of its children are included. This is defined recursively. Thus, the menu line for the first child of the main menu will be followed by the menu lines for all of the children of the first child of the main menu, before storing the menu lines for the second child of the main menu, and so on.

An example is provided as follows:

Title Line
  Menu Line for Main Menu
  Menu Line for first child of Main Menu
    Menu Line for First child of first child of Main Menu
    Menu Line for second child of first child of Main Menu
  Menu Line for second child of Main Menu
  Menu Line for first child of second child of Main Menu
  Menu Line for second child of second child of Main Menu
  Menu Line for third child of Main Menu Characters such as | in the above example indicate that the field to the right of the | is an optional field. Characters such as !, /, $, %, ^, @, [, and | in the file demarcate fields in the file. ^ is the comment character, any input on the current line after ^ character is ignored. A "(" is placed before the number to dial, such as the bank account number, to hide it from displaying the account number on the phone display.

Explanation of the Fields in File Format

The fields in the file format are as follows:
  <field 1A>: Title of the Menu, appears on the screen when it first pops up;
  <field 1B>: URL corresponding to service provider or the voice menu;
  <field 1C>: Initial delay in seconds between dialing phone and remote end being able to accept keypad input from the user's telephone;
  <field 2>: Text that represents the phone menu option. It appears on the button;

<field 3A>: number to dial out from telephone keypad, when the corresponding button is press the first time. If <field 3B> is absent, <field 3A> specifies the number to dial out when the button is pressed any time;

<field 3B>: Number to dial out when the button is pressed the second time and any time after that;

<field 4>: Children Number: Number of menu options on the next level;

<field 5>: <field 5.1>/<field 502>;

<field 5.1>: The number of menu levels to back up when the back button/tab is pressed;

<field 5.2>: The numeral to dial out when back button/tab is pressed;

<field 5A>: <field 5A.1>/<field 5A.2>;

<field 5A.1>: The number of levels to back up when the main button/tab is pressed;

<field 5A.2>: The numeral to dial out when main button/tab is pressed;

<field 6>: Pointer to a previously defined menu;
  Reused functionality of other buttons on the menu. It is best described in examples:
    Ex. 1: If the field says P1S1S2, the current button has the same functionality as it's parent (P1)'s $1^{st}$ Child's $2^{nd}$ Child.
    Ex. 2: If the field says P2S2S4, the current button has the same functionality as it's parent's parent (P2) 's $2^{nd}$ Child's $4^{th}$ Child.

It is noted that <field 4> above, must be specified as 0 in order for this field to activate. <field 7>: Message for the next screen. This appears when any choice from current menu is made.

It is noted that the minimum requirement for each line is the following:
  Title Line: !<field 3A>%<field 4>$
  Menu Line: <field 1A>!<field 3A>%<field 4>$ An exemplary file (e.g., for the Chase Bank, Graphical Voice Response System) is provided below.

```
File: ChaseBank.txt
Chase Bank/http://www.chase.com/0!1%8$@[Main Menu  Instant Account
Information !1%5$/1/*9@[Instant Account information Checking/MM/Savings
info!1%2$1/*8/2/*9@[Checking/savings information
Checking! (127847216293#, 11670/2,,1278407216243#%6$2/*8|3/*9@[Acct Activity
        Transaction History !1%2$1/*8|4/*9$@P1[Next 5 transactions
          List of accts!*6%0$$@[List of accounts
        Check/Withdrawal!2%2$1/*8|4/*9$@[Check/Withdrawal
          Check number!1 %0$2/*8|5/*9$@[Enter check number, #
         Verify by Amount!2.%0$2/*8|5/*9$@[Enter amount, #
        Deposit Information!3%2$1/*8|4/*9$@[Deposit Information
          Verify by Amount!%0$2/*8|5/*9$@[Enter amount, #
          Last 5 deposits!2%1$2/*8|5/*9$@[Last 5 deposits
            Next!#%0$$@P1[Last 5 deposits
        Bank Stationary!5%0$4/*9$@[ATM/Chase by Mail Envelopes
        Repeat Balance!*7%0$@P1[Repeat Balance
        List of Accounts!*6%3$@[List of accounts
          List of accounts!1%2$@[List of accounts
            John Checking!1%0$@P3[Account Activity
            John Savings!2%0$@P3[Account Activity
          Enter Card #!2,#%0$@P1[List of accounts
          Enter Acct #!3%6$@[Account John
Checking!127847216293#,43210%0$@P3[Account Activity John
Savings!1278407216243#,43210%0$@P3[Account Activity John
            Jill CT Checking!123456789012#,12345%0$@P3[Account Activity
            Jill CT Savings!345678901234#,12345%0$@P3[Account Activity
            Jill NY Checking!987654321012#,98765%0$@P3[Account Activity
            Jill NY Savings!876543210987#,98765%0$@P3[Account Activity
Savings! (127847216293#, 11670/2,, (1278407216243#%0$2/*8|3/*9@P1S1[Savings
        Overdraft
info!2%0$2/*9@[Overdraft information, Enter acct no, #  Credit Card
info!3%0$2/*9@[Credit Card information
        Installment Loan!4%0$2/*9@[Installment Loan
        Chase Vista Funds!5%0$2/*9@[Chase Vista Funds
Pay by phone, xfer funds!2%3$1/*9@[Pay by phone, transfer funds
        Transfer between accounts!1%1$1/*8|2/*9@[Transfer between accounts
          Enter Card no + # + 2
digits!(1234567890123456#, 12%2$2/*8|3/*9@[From Account
          From Checking!1%1$@2/*8|5/*9[Enter amount then press #
          To savings!2%2$4/* */5/*9@[From Checking to savings
          Confirm!1%0$5/*8|6/*9@[Confirming
          Cancel!2%0$5/*8|6/*9@[Canceling
        From Savings!2%1$2/*8|5/*9@[Enter amount then press #
          To Checking!1%2$4/*8|5/*9@[From savings to checking
          Confirm!1%0$5/*8|6/*9@[Confirming
          Cancel!2%0$5/*8|6/*9@[Canceling
      Pay to credit or loans!2%0$2/*9@[Pay to credit or loans
      Pay by phone!3%0$2/*9@[Pay by phone
   Chase Vista Funds!3%5$1/*9@[Chase Vista Funds
      Balance/History!%0$2/*9@[Vista Funds Balance/History
      Add Shares!2%0$2/*9@[Add Shares
      Redeem Shares!3%0$2/*9@[Redeem Shares
      Money Market Yields!4%0$2/*9@Money Market Yields
```

-continued

```
    Previous Menu!*8%0$2/@[Press back to go to prev menu
Verify Checks!4%1$1/*9@[Enter acct no., #, and Check number, #, amount, #
    Previous Menu!*8%0$2/,@[Press back to go to prev menu
Chase Misc services!5%3$1/*9@[Chase Misc Services
    Check Book Reorder!1%0$2/*9@
    ATM Deposit Envelopes!2%0$2/*9@
    Bank by mail deposit env!3%0$2/*9@
Rates!6%6$1/*9@[Rates
    CD/IRA!1%0$2/*9@CD/IRA rates
    Checking/savings!2%0$2/*9@[Checking/saving rates
    Loan!3%0$2/*9@[Loan rates
    Vista Funds!4%0$2/*9@[Vista Funds Rate
    Investment products!5%0$2/*9@[Investment product rates
    Mortgage!6%0$2/*9@[Mortgage Rates
Instructions!7%0$1/*9@[Instructions
Customer representative!*0%0$@[Wait for Customer Service Representative
```

While the overall methodology of the invention is described above, the invention can be embodied in any number of different types of systems and executed in any number of different ways, as would be known by one ordinarily skilled in the art.

For example, as illustrated in FIG. 8, a typical hardware configuration 800 of an information handling/computer system for incorporating the inventive structure shown in FIG. 1 in accordance with the invention preferably has at least one processor or central processing unit (CPU) 811. The CPUs 811 are interconnected via a system bus 812 to a random access memory (RAM) 814, read-only memory (ROM) 816, input/output (I/O) adapter 818 (for connecting peripheral devices such as disk units 821 and tape drives 840 to the bus 812), user interface adapter 822 (for connecting a keyboard 824, mouse 826, speaker 828, microphone 832, and/or other user interface device to the bus 812), communication adapter 834 (analogous to adapter 110 shown in FIG. 1 and for connecting an information handling system to the Internet, intranet, a data processing network, etc.), and display adapter 836 (for connecting the bus 812 to a display device 838). Additionally, an external controller 850 (e.g. analogous to the controller 111 shown in FIG. 1) can be coupled to the phone system through the network and communications adapter 834. Additionally, while not specifically shown in the FIG. 8, the secure encrypted memory 109 of FIG. 1 may be implemented as one of the peripheral units shown in FIG. 8 (e.g., disk unit 821 etc. coupled through the I/O adapter or another device coupled to the system bus 812).

Further, while the present invention has been described primarily in terms of software or software/hardware configuration, the same or similar functions could be implemented in a dedicated hardware arrangement.

In addition to the hardware/software environment described above, a different aspect of the invention includes a computer-implemented method for providing a graphical voice response method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

Thus, this aspect of the present invention is directed to a programmed product, including signal-bearing media tangibly embodying a program of machine-readable instructions executable by a digital data processor to perform a method of communicating between a calling party and a called party.

This signal-bearing media may include, for example, a random access memory (RAM) such as for example a fast-access storage contained within the computer. Alternatively, the instructions may be contained in another signal-bearing media, such as a magnetic data storage diskette 900 shown exemplarily in FIG. 9, directly or indirectly accessible by the computer.

Whether contained in the diskette, the computer, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g., CD-ROM, WORM, DVD, digital optical tape, etc.), paper "punch" cards, or other suitable signal-bearing media including transmission media such as digital and analog and communication links and wireless. In an illustrative embodiment of the invention, the machine-readable instructions may comprise software object code, compiled from a suitable language.

While the invention has been described in terms of preferred embodiments, those skilled in the art will recognize that the invention can be practiced with modification within the spirit and scope of the appended claims.

Indeed, the present invention allows much flexibility to pursue further implementation. For example, the menu options above are represented as buttons on the screen. However, many phone menus prompt users to input secure information such as credit card number, social security number and pin number. An advantageous extension is to define the InfoFile format such that a text field can be specified. Then, users can input their information through the text field on the screen. Upon receiving the information, the graphical voice response system of the invention dials out the input numbers and the screen displays the next level.

Another useful feature is the ability to read the InfoFile from the web. This feature provides the most updated version of the phone menu to the users. Advertisement or announcement can also be posted on the screen.

Moreover, the Graphical Voice Response System as a software application has great utility, and, for example, can be incorporated into screens of cellular phones and Internet phones. Hence, the telephone system need not be a line transmission system (e.g., point-to-point etc.), but can be operated in a wireless communications environment (e.g., radio/microwave frequency, etc.).

Thus, while the exemplary embodiment above is directed to a telephone, the present invention is applicable to any device that has a screen and the ability to make phone calls. Thus, devices such as cellular phones, screen phones, personal computers with phone dialer programs, can make use of this invention. Some exemplary phone menus which would find great benefit in incorporating the system and method of the present invention include train/plane schedules, banking information, stock market trading, movies, weather, and help desks such as tourist information centers, etc.

It is noted that fast path programming discussed above with regard to the fast path menus, could be performed over the network using another auxiliary device operatively connected to the phone. Such an auxiliary device may utilize and could be either incorporated into or coupled externally to the controller 850 shown in FIG. 8.

What is claimed is:

1. A communication system for communicating between a calling party and a called party, comprising:

means for calling a communication device of a called party;

a sensor for sensing whether a voice menu file is associated with said communication device of said called party and if said voice menu file is not locally available then for signaling to obtain said voice menu file from one of said communication device of said called party and a third party source; and an interactive display for displaying said voice menu file.

2. A communication system for communicating between a calling party and a called party, comprising:

means for dialing a communication device of a called party;

means for sensing whether a voice menu file is associated with said communication device of said called party and for signaling to obtain said voice menu file from one of the communication device of said called party and a third party source; and an interactive display for displaying said voice menu file.

3. The communication system according to claim 2, wherein said communication device comprises a telephone.

4. The communication according to claim 2, wherein said third party source comprises one of the Internet, an intranet, a world-wide-network, and another external storage medium.

5. The communication system according to claim 2, further comprising means for determining whether said voice menu file is available locally at said calling party side.

6. The communication system according to claim 2, further comprising means for determining whether said voice menu file is available only at said called party side.

7. The communication system according to claim 2, further comprising means for parsing said voice menu file and for displaying at least one input device on said display for actuation by said calling party to thereby select an item from said voice menu file.

8. The communication system according to claim 7, wherein said means for parsing further displays text related to said at least one input device.

9. The communication system according to claim 2, further comprising means for responding to a user input, to display selectively a main menu, a next level of said voice menu file, and a previous level of said voice menu file, corresponding to said user input.

10. The communication system according to claim 2, further comprising means for requesting said voice menu file from said called party when said voice menu file is available only at said called party.

11. The communication system according to claim 10, further comprising a storage device coupled to said interactive display for storing said voice menu file.

12. The communication system according to claim 2, further comprising means for creating a fast path to a lower level portion of said menu file such that said lower level portion can be accessed immediately without any further input from said calling party.

13. The communication system according to claim 2, further comprising means for encrypting predetermined, sensitive information such that said sensitive information is not displayed on said interactive display when said sensitive information is input to said system.

14. The communication system according to claim 2, wherein said communication system is connected to a network, further comprising means coupled to said network for programming said communication device such that said communication system is programmable by an external device coupled to said network.

15. The communication system according to claim 2, further comprising means for downloading said voice menu file from a source connectable to said communication device.

16. The communication system according to claim 2, wherein said menu file is pre-loaded into said communication device.

17. The communication system according to claim 2, further comprising means for obtaining said voice menu file from said called party's communication device.

18. The communication system according to claim 1, further comprising means for determining whether said voice menu file is available locally at said calling party side.

19. The communication system according to claim 2, further comprising means for creating a fast path to a higher level portion of said voice menu file such that said higher level portion can be accessed immediately from a lower level portion of said voice menu file without any further input from said calling party.

20. The communication system according to claim 2, further comprising an information file for containing voice menu information, and display communication device menu information as input devices on said interactive display, said information file containing predetermined, sensitive information.

21. A communication system for communicating between a calling party and a called party, comprising:

a dialer for dialing a telephone of a called party;

a detector for detecting whether a voice menu file is associated with said telephone of said called party and for signaling to obtain said voice menu file from one of the communication device of said called party and a third party source; and an interactive display for displaying said voice menu file.

22. A method for communicating between a calling party and a called party, comprising:

dialing a communication device of a called party;

sensing whether a voice menu file is associated with said communication device of said called party and if said voice menu file is not locally available then signaling to obtain said voice menu file from one of the communication device of said called party and a third party source; and interactively displaying said voice menu file.

23. A signal-bearing medium tangibly embodying a program of machine-readable instructions executed by an apparatus to perform a method of communicating between a called party and a calling party, comprising:

dialing a communication device of a called party;

sensing whether a voice menu file is associated with said communication device of said called party and when said voice menu file is not locally available then signaling to obtain said voice menu file from one of the communication device of said called party and a third party source; and interactively displaying said voice menu file.

* * * * *